United States Patent
Rubricius

[15] 3,698,360
[45] Oct. 17, 1972

[54] SMALL ANIMAL CAGE

[72] Inventor: Jeanette L. Rubricius, P.O. Box 66, New York, N.Y. 11228

[22] Filed: Nov. 10, 1970

[21] Appl. No.: 88,401

[52] U.S. Cl. .......................... 119/17, 119/19, 119/22
[51] Int. Cl. ............................................. A01k 01/02
[58] Field of Search ........................... 119/17, 22, 19

[56] References Cited

UNITED STATES PATENTS

| | | | |
|---|---|---|---|
| 3,177,848 | 4/1965 | Rubricius | 119/17 |
| 3,087,458 | 4/1963 | Bennett, Jr. | 119/17 |
| 1,840,202 | 1/1932 | Kerr | 119/17 |
| 2,523,615 | 9/1950 | Fell | 119/22 |
| 3,292,582 | 12/1966 | Rubricius | 119/17 |

Primary Examiner—Hugh R. Chamblee
Attorney—Stowell & Stowell

[57] ABSTRACT

A small animal cage is formed as a single unit from plastic compositions of a nature enabling it to accommodate scratching and biting actions by a housed animal without deleterious effect and in a structural symmetrical fashion so that several cages can be stacked in an interlocked and interchangeable assembly. Each cage is formed with five solid walls and an open front which is closed off by hinged grill doors and each cage can be individually flushed and drained. The floor of each cage is pitched toward one rear corner wherein an opening communicates with a vertical drain pipe that is nested in a corner recess of the cages and empties into a drain conduit that extends along the rear of a structural foam block having a rearwardly slanting top wall supporting the floor of the lowermost cage with the top walls of the cages being sloped rearwardly causing the floors of the upper cages to slope the same as the bottom cage.

16 Claims, 9 Drawing Figures

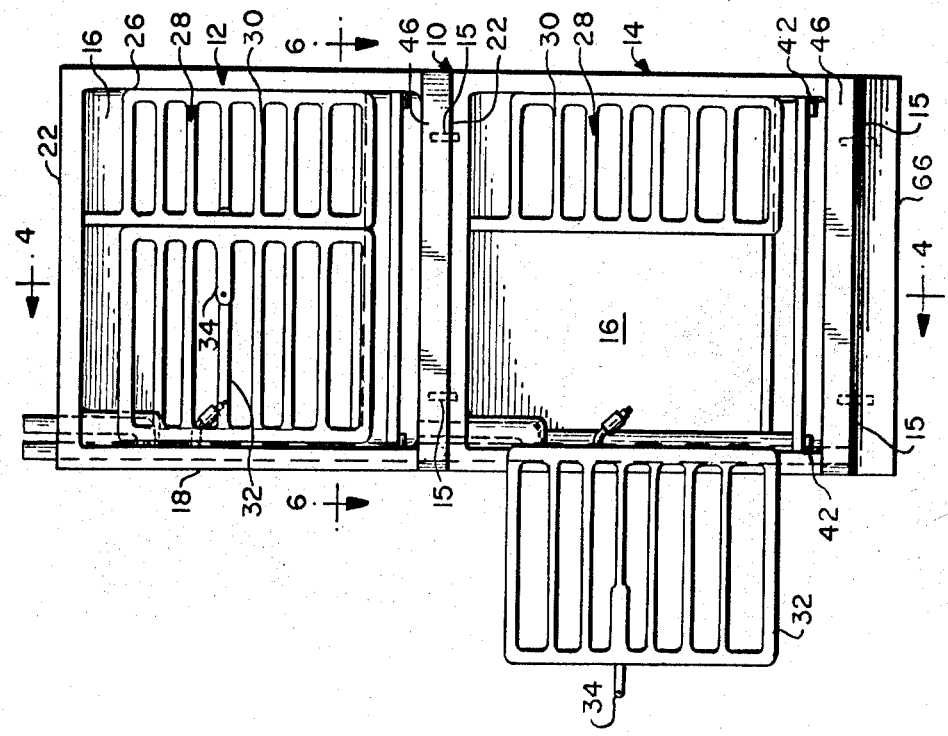
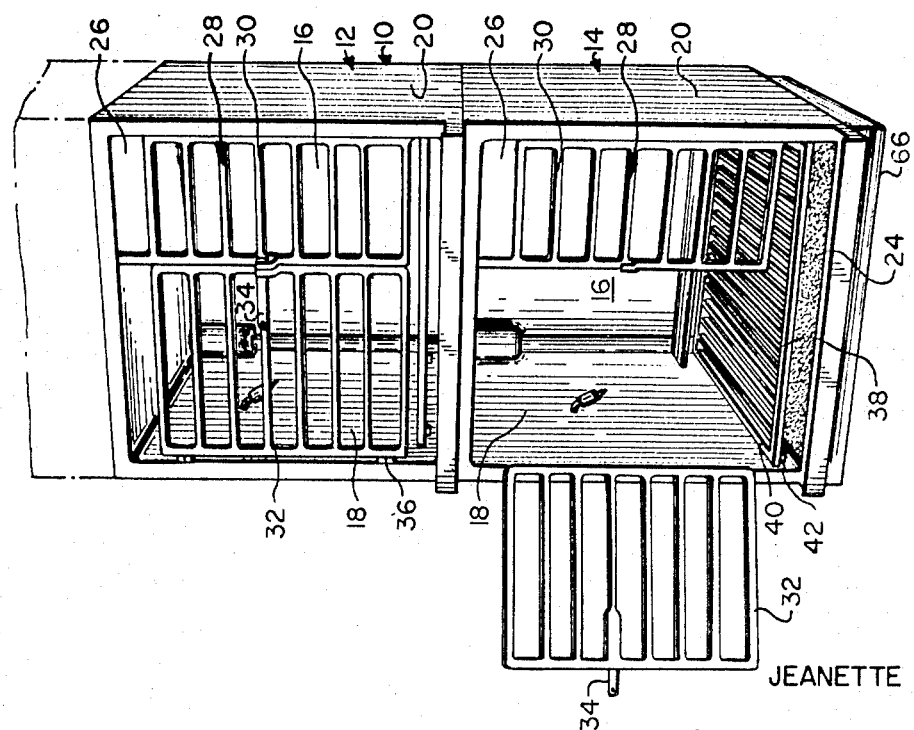
INVENTOR
JEANETTE L. RUBRICIUS
ATTORNEY

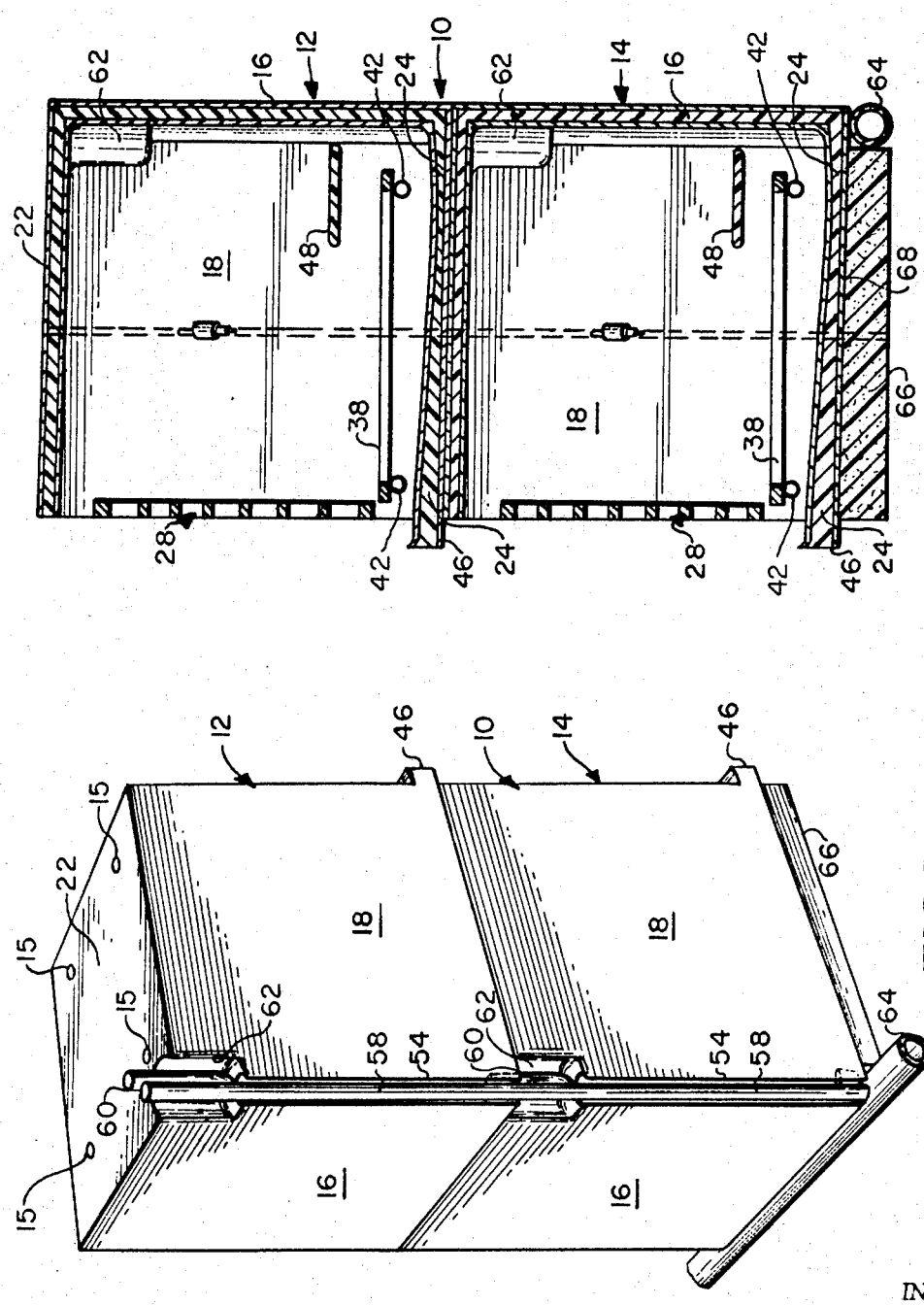

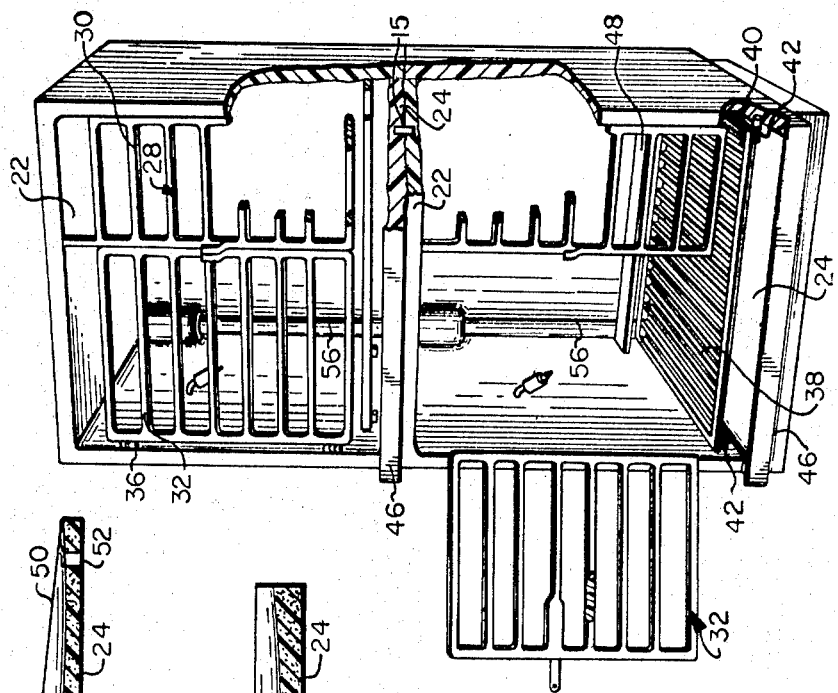
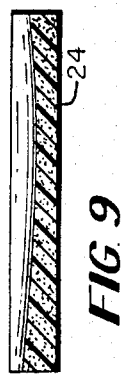
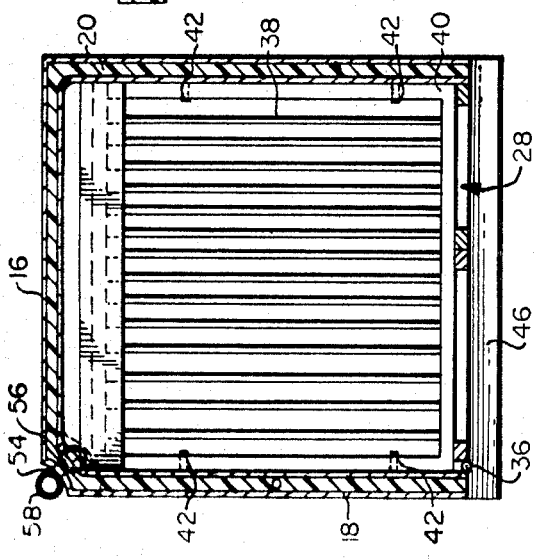
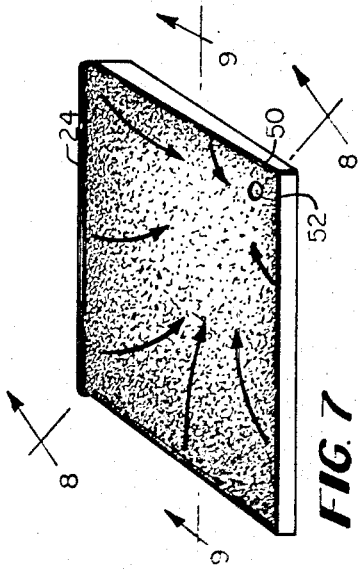
INVENTOR
JEANETTE L. RUBRICIUS
BY Nowell + Stowell
ATTORNEY

SMALL ANIMAL CAGE

BACKGROUND OF THE INVENTION

1. Field of the Invention

The present invention generally appertains to improvements in cage constructions and especially relates to new and novel improvements in small animal cages or housing units.

2. Description of the Prior Art

In my prior patents, such as U.S. Pat. Nos. 3,177,848 and 3,292,582, there are disclosed small animal housing units consisting of at least a pair of super-imposed cages having integrally formed side, top, bottom and back walls with such units being adapted to be assembled in side-by-side and back-to-back relationship. The side-by-side units are provided with a common drainage system in the form of troughs integrally formed in the rear of the floors of the cages.

While the provision of such cages with an integral trough drainage system was a distinct advantage in animal care, nonetheless, there is a disadvantage in that the troughs in the rear of the cages are not readily accessible for cleaning. Also, difficulty is encountered, with such trough drainage system, in setting up and properly aligning the cages for side flow drainage for adjacent cage units have to be stepped on cement basins which are costly and require exact positioning in order that adjacent cages match properly.

Furthermore, the trough drainage systems in the main allow excreta from one housed animal to travel through the cage of another housed animal which is an invitation for spreading of disease among a colony of caged animals. Thus, such trough drainage systems, while a definite and distinct advantage over former systems, does have certain drawbacks, primarily in inability to clean easily and in failure to allow for individual sanitation of each cage.

Apart from the drainage systems and other structural appointments of the animal cages disclosed in the foregoing patents, for example, such cages are constructed from materials and in a manner so that they are not resistant to scratching and biting actions by the housed animals. Past cages are constructed with an outer shell of fiberglass and an inner foam body such as polystyrene or polyurethane foam. This is still a very satisfactory material construction but animals occasionally bite or scratch through the outer skin or shell whether formed of fiberglass, epoxy resin or polypropylene. Usually the outer coating of the fiberglass is a coating of polyester of exceptional hardness to render the surface scratch resistant. The hard coat of the fiberglass is brittle and occasionally chips. Further such hard gelcoat of the fiberglass does not stand up too well under the action of a caustic solution used in cleaning the cages.

SUMMARY OF THE INVENTION

In answer to the drainage disadvantage of the aforedetailed animal housing units, a primary object of the present invention is to provide single, self-sufficient small animal cages which have individual drainage arrangements and which are individually self-cleaning with no possible drainage communication with adjacent cages.

Ancillary to the foregoing object, it is another primary object of the present invention to form the single cages in a structural manner so that they can be interlockingly stacked in an interchangeable fashion and so that such stacks or single cages can be arranged in lateral side or back engaging relationships.

Another primary object of the present invention is to construct the single cages from plastic compositions in a way so that not only are the cages resistant to damage or injury from scratching or biting actions by the housed animals but also such cage compositions will allow the animals to bit and chew on parts of the cages without damaging the cages and without injury to the teeth of the animals.

Generally stated, each cage is a single self-sufficient unit which has five solid walls and an open front that is closed off by hinged bar-type or grill design doors. The cage has a trapezoid outline in cross section as it rests on a bottom foam supporting block or on the rearwardly sloped top wall of an underlying similar cage. The cages are constructed so that they are symmetrical and are adapted to be vertically stacked in a pinned interlocated assembly with one cage being interchangeable with another and with a top cage being identical with a bottom cage. Whether a top cage or a bottom cage, the floor of each cage slopes rearwardly at the same angle since the top wall of the supporting foam block and the top walls of the cages slant rearwardly at the same angle.

Each cage has a floor that is pitched toward one rear corner where a drain is located. The meeting walls of the cage at this corner form a recess wherein a small drain pipe is vertically located with the pipe running from an upper cage along a lower cage in recessed fashion in the indented corners of the cages. The corner of the cage is further formed so that the floor drain can open into the drain pipe that is common to the stacked cages. The vertical drain pipe empties into a bottom drain conduit which is common for a number of stacked cage assemblies and which runs along the rear of the foam supporting block for the bottom cage. The floor of each cage projects beyond the rest of the sides to define an overhanging lip which prevents an animal in an upper cage from soiling a lowermost cage.

Each cage has a false bottom which is attached to the interior of the opposing sides of the cage by stainless steel pins. The false bottom is constructed, preferably, of polyurethane, aluminum or any other suitable non-porous material. The false bottom is terminated short of the rear wall of the cage, ending approximately three or four inches short of the rear wall beneath an overhanging shelf that extends between the side walls of the cage unit at the rear wall thereof and on which a caged animal usually reclines. Such arrangement offers the housed animal an exercising medium.

The grill design front closure for the cage has a fixed bar portion and a hinged door portion and carries suitable latch means and has means for supporting feeding bowls and descriptive cards. Such closure arrangement is similar to past designs but is formed from material that will allow the animal to bite and chew on the bars without damage thereto and without injury to the animal's teeth. One such material is a semielastomeric polyurethane. The polyurethane has hinges molded to the door portion and attached to the adjoining side wall of the cage by adhesive material. The proper location of the hinges is ascertained by depressions provided on the side wall of the cage.

Also, the front closure can be an elastomeric door which will permit the animal to bite and chew thereon without damage or injury. In addition, the closure can be of a one-piece structural foam grill design configuration with a thickened skin of abrasion resistant, semi-flexible material, such as polyurethane, so that it is resistant to the action of scratching and biting by active animals.

It is also envisioned that the cage will be of fiberglass with a metal or aluminum front closure arrangement. On the other hand, the closure can be an elastomeric closure. The cage can be of structural foam with a semi-flexible skin and having a metal or a polyurthane closure. The cage can also be a vacuum formed cage of sheet plastic or it can be of fiberglass with or without a foam core.

BRIEF DESCRIPTION OF THE DRAWINGS

FIG. 1 is a front perspective view of two small animal cages constructed in accordance with the teachings of the present invention and arranged in a vertically stacked assembly, with each cage unit being identical in construction and design.

FIG. 2 is a front elevational view of the cage assembly shown in FIG. 1.

FIG. 3 is a rear perspective view of the cage assembly shown in FIG. 1.

FIG. 4 is a vertical sectional view taken substantially on line 4—4 of FIG. 2.

FIG. 5 is a perspective view similar to FIG. 1 but with portions of the walls and floors broken away and shown in section.

FIG. 6 is a horizontal sectional view taken substantially on line 6—6 of FIG. 2.

FIG. 7 is a perspective showing of the pitched floor for the cages.

FIG. 8 is a horizontal cross-sectional view of the floor taken on line 8—8 of FIG. 7.

FIG. 9 is a horizontal cross-sectional view of the floor taken substantially on line 9—9 of FIG. 7.

DESCRIPTION OF THE PREFERRED EMBODIMENT

Referring now more particularly to the accompanying drawings, the reference numeral 10 generally designates a small animal cage or housing assembly which in the illustrated instance is composed of two identical cage units 12 and 14 that are arranged in vertically stacked relation to produce the given vertical cage assembly. In this regard, more than two cage units can be assembled one on top of the other. The identical cage units 12 and 14 are held together in an interlocked and interchangeable vertical relation by locking pins 15, as shown generally in FIG. 5. Each cage unit is identically constructed and designed so that the cage units are interchangeable in the assembly 10.

Each of the cage units 12 or 14 is cast or molded as a single self-sufficient unit from materials to be more fully described. In its molded single unit form, each cage unit has a back or rear wall 16, opposing side walls 18 and 20, a top wall 22 that is sloped downwardly toward the rear wall and a bottom wall or floor 24. The front 26 of each cage unit is open and is closed off by a grill design or bar-type front closure 28.

Each of the front closures 28 includes a fixed bar portion 30 and a hingedly mounted bar door portion 32 with cooperating latch means 34 for locking the hinged door portion in closed position to the fixed grill portion 30. The door portion 32 has hinges 36 molded thereto and fastened to the adjoining edge of the side wall 20, as shown in FIG. 6, by adhesive material. The side wall 18 has suitable depressions to accomodate the hinge mounting.

Such grill closure is provided with various feeding bowl holding arrangements and with other arrangements similar to those disclosed in U.S. Pat. No. 3,177,848 and is constructed of materials to be described.

A false bottom 38 is provided in each cage unit and is disposed above the floor 24. The false bottom is constructed from a non-porous material, such as polyurethane or aluminum and is in the form of a grill or perforated sheet. The grill work platform structure of the false bottom has opposing side edges 40 that are attached to the interiors of the side walls 18 and 20 by suitable stainless steel pins 42, which position the side edges 40 just above the bottom wall or floor 24.

The floor 24 extends somewhat beyond the rest of the side walls 18 and 20 to produce an overhanging lip 46 which prevents an animal in an upper cage from soiling the cage unit therebelow.

The false bottom 38 does not extend to the rear wall 16 but is spaced forwardly therefrom and has its inner portion underlying a horizontal shelf 48 fixedly located transversely between the side walls 18 and 20 at the rear wall 16. The shelf is used for reclining by the caged animal with the shelf and false bottom arrangement also providing an exercising medium for the animal.

Each cage unit 12 or 14 is cast or molded as a single unit from a foam core with an outer thickened skin or semiflexible material such as polyurethane. The cage also is molded as a single unit from fiberglass or a polyester reinforced with fiberglass and with or without an integral foam core. As shown in FIG. 5, the cage unit can be of a one-piece structural foam with a thickened skin and with the front closure of an elastomeric material, whereby the housed animal can safely chew on the bars of the front closure. On the other hand, the cage unit can be a structural foam cage with an integral skin and a metal or polyurethane door assembly. Or it can be a fiberglass cage with a metal or aluminum door. It is also intended that the entire cage unit can be a vacuum formed cage of sheet plastic.

The floor 24 of each cage unit 12 or 14 is pitched toward one rear corner area 50 thereof with such corner area having a vertical drain opening 52 formed therethrough. The floor, as shown in FIGS. , 7–9, is dished out laterally from side to side and is sloped diagonnally toward the rear corner area 50 so that the bowl-like pitch of the upper surface of the floor will cause any liquid and excreta or the like to flow freely and speedily from all parts of the floor surface to the drain corner area 50 and empty into the drain opening 52. Thus, a force of water introduced into the front of the cage unit will wash the floor surface and carry all matter thereon, such as fecal matter, to the drain opening 52 with no possibility of any puddles being formed.

The side wall 20 and the rear wall 16 of each cage unit 12 or 14 are outwardly joined by a concaved corner joint 54 and inwardly joined by a convex complemental corner joint 56 with the corner structure providing a vertical recess within which a vertical drain pipe 58 is nestingly accomodated. The drain pipe 58, as shown especially in FIG. 3, is common to the stacked upper and lower cage units 12 and 14 and extends commonly therealong in the recessed corners of each cage unit. The pipe is formed just below the floor of each cage unit with an offset feed branch 60 that has its open upper end in underlying registry with the drain opening 52 in in the floor. The upper end portion of each corner recess is further enlarged, as at 62, to accomodate the Y-shaped connection where the branch feed pipe section 60 extends off from the pipe 58 to the floor drain opening 52 for each floor.

The lower end of the vertical drain pipe 58 is emptingly connected to a horizontal drain conduit 64 that extends along the rear edge of a structural foam block 66 which supports the bottom cage unit 14. The drain conduit 64 is common to any number of laterally adjoining or back-to-back adjoining vertical cage assemblies 10 and empties into a suitable sewer drain in the supporting floor where the cage assemblies are housed. The base block 66 sits flat on the room floor and has a rearwardly slanted top wall 68 on which the floor of the bottom cage unit 14 rests with the floor of such cage unit sloping rearwardly. The top wall 22 of the cage units are slanted rearwardly at the same pitch as the top wall 68 of the support block 66 so that the floor of the upper cage unit 12 slopes rearwardly at the same angle as the floor of the bottom cage unit.

From the foregoing description taken in conjunction with the attached drawings it is believed that the use and operation of the cage unit or units in various assembled arrangements will be clear and it can be appreciated that the present invention fully accomplishes the objects as hereinbefore set forth. It will be understood that various modifications and changes may be made in the form of the structure shown and described and that the Abstract Of The Disclosure and the description and attached drawings are in no way to be considered delimiting or exhaustive of the scope of the present invention which is only expressed by the terms and spirit of the appended claims.

What is claimed is:

1. A small animal cage comprising a top wall, a bottom wall, opposing side walls and a rear wall and having an open front, a grill closure closing off the open front and including a hinged door affording access to the interior of the cage, said bottom wall constituting the floor for the cage and having an upper surface formed to drain toward one rear corner area thereof, said rear corner area of the floor having a vertical drain opening, and external drain means arranged along the exterior of the said rear corner of the one said side wall and the rear wall and extending vertically of the floor and arranged in sealed drain communication with the drain opening in the drain corner area of the floor, said corner being exteriorly indented to provide a nesting recess in which the drain means is positioned so that it does not protrude beyond the outer surfaces of the said one side wall and the rear wall whereby a plurality of such cages may be stacked in contiguous contact both side to side and back to back.

2. The invention of claim 1 wherein the top, bottom, side and rear walls are molded as a unit from a structural foam with an integral outer skin of polyurethane and the front closure is formed from an elastomeric material.

3. The invention of claim 1 wherein the front closure is formed of elastomeric material which can be chewed by the housed animal.

4. The invention of claim 1 wherein the front closure has a metal door.

5. The invention of claim 1 wherein the top, bottom, side and rear walls are molded as a unit from fiberglass.

6. The invention of claim 1 wherein the top, bottom, side and rear walls are molded as a unit from fiberglass and the door is formed from metal.

7. The invention of claim 1 wherein the top, bottom, side and rear walls are molded as a unit from fiberglass having a foam plastic core.

8. The invention of claim 1 wherein the top, bottom, side and rear walls are molded as a unit from a structural one-piece foam having a covering skin of semi-flexible material.

9. The invention of claim 8 wherein said skin is of polyurethane.

10. The invention of claim 1 wherein the top, bottom, side and rear walls are cast as a unit in vacuum from sheet plastic.

11. The invention of claim 1 wherein said bottom wall rests on a structural foam block having a rearwardly sloped upper supporting wall for the bottom wall that slopes rearwardly.

12. The invention of claim 11 wherein a horizontal drain conduit extends along the rear edge of the supporting block and to which the drain means is connected, said drain conduit underlying the rear edge of the bottom wall of the cage which juts out beyond the supporting block so as to overlie the drain conduit.

13. The invention of claim 1 wherein said upper surface of the floor is dished out laterally from side to side and is sloped diagonally toward the rear corner area so that it is pitched toward the drain corner area and the drain opening therein.

14. The invention of claim 1 wherein said drain means is a vertical drain pipe arranged vertically in the corner recess and having a vertical branch section offset inwardly and disposed in underlying sealed drainage communication with the drain opening.

15. The invention of claim 14 wherein two or more cage units are arranged in vertically stacked assembly and the drain pipe is common to all of the cages and extends vertically therealong nested within the vertically aligned corner recesses of the cages and has a vertical branch section offset inwardly at the bottom of each cage and underlying the floor of each cage and disposed in sealed drainage communication with the drain opening in each floor.

16. The invention of claim 15 wherein the bottom wall of the bottom cage in such vertically stacked assembly rests on a block and has a rear edge jutting out rearwardly beyond the block and being substantially horizontally disposed and a horizontal drain conduit underlying the protruding rear edge and to which the vertical drain pipe is connected as part of the drain means for the stacked cage assembly.

* * * * *